United States Patent
Åbom et al.

[11] 3,994,028
[45] Nov. 30, 1976

[54] TOILETS

[76] Inventors: Johan Viktor Åbom, Poppelgatan 12; Nils Åke Valter Ogeblad, Laktaregatan 6 C, both of 421 74 Vastra Frolunda, Sweden

[22] Filed: Feb. 13, 1974

[21] Appl. No.: 442,155

[30] Foreign Application Priority Data
Feb. 15, 1973 Sweden .............................. 7302119

[52] U.S. Cl. ........................................ 4/9; 4/111; 4/131
[51] Int. Cl.² ........................................ A47K 11/02
[58] Field of Search .............. 4/1, 8, 111, 115, 118, 4/131–133; 110/9 E, 9 R

[56] References Cited
UNITED STATES PATENTS

| | | |
|---|---|---|
| 3,020,559 | 2/1962 | Blankenship et al. ................... 4/131 |
| 3,733,617 | 5/1973 | Bennett .............................. 4/131 X |
| 3,765,035 | 10/1973 | Mutchler .............................. 4/131 |

*Primary Examiner*—Richard E. Aegerter
*Assistant Examiner*—Stuart S. Levy
*Attorney, Agent, or Firm*—Bucknam and Archer

[57] ABSTRACT

A toilet comprising a hermetically sealable container for human body waste and urine, the container being connectable to a vacuum source for bringing about boiling off, in the container, of the urine and the liquid present in the human body waste, at low temperature.

6 Claims, 1 Drawing Figure

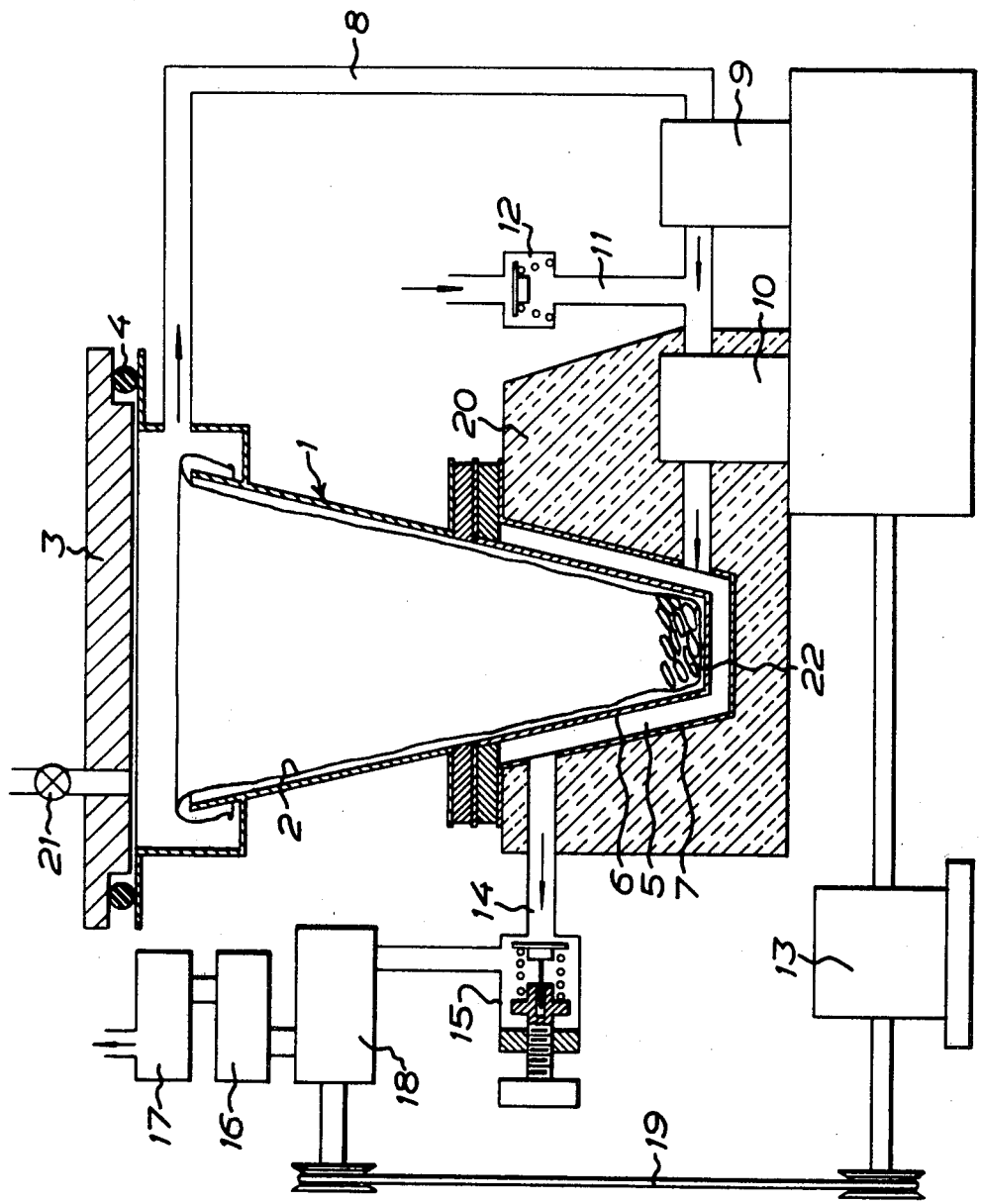

TOILETS

The present invention relates to a toilet which comprises a hermetically sealable container for human body waste and urine, the container being connectable to a vacuum source for bringing about boiling off, in the container, of the urine and the liquid present in the human body waste, at low temperature. When the liquid has been removed the temperature is allowed to increase under the prevailing low pressure, which results in the conversion of the human body waste to an almost odourless powder. The advantage of the toilet suggested according to the invention is, thus, that the volume of the urine and human body waste is substantially reduced and that the unpleasant smells from the human body waste and urine are practically eliminated.

The invention will be described in greater detail hereinbelow with reference to the accompanying DRAWING which schematically illustrates, by way of example, a preferred embodiment of the toilet.

The container 1 of the toilet is intended as a receptacle for human body waste and urine, these being preferably collected in a specially exchangeable bag 2 of aluminium or similar material which is heat conducting and heat resistant. It should be possible hermetically to seal the container 1 in relation to ambient air, and, for this reason, the container is fitted with a lid 3 and its associated sealing ring 4 which suitably is in the form of an O-ring and should be smeared with vacuum grease. As will be apparent from the drawing, the container 1 is incorporated in a toilet bowl, the lid 3 being the lid of the toilet bowl.

At its lower portion, which is intended as a receptacle for the urine and human body waste, the container 1 is surrounded by a heating chamber 5 with an inner jacket 6, and an outer jacket 7.

The container 1 is connected to a vacuum pump 9 by a conduit 8. The delivery side of the vacuum pump 9 is, in its turn, connected to the suction side of a compressor 10, while the delivery side of the compressor 10 is connected to the heating chamber 5. An air intake 11 is disposed between the vacuum pump 9 and the compressor 10 and is fitted with a non-return valve 12 which controls the air supply between the pump 9 and the compressor 10. The vacuum pump 9 and the compressor 10 are built together to form a two-stage unit which is driven by a motor 13.

From the heating chamber 5 extends a conduit 14 which, normally, would discharge into the open air. The conduit 14 is fitted with a control valve 15 which controls the pressure in the heating chamber 5 and, thereby, the compression ratio in the compressor 10, which determines the temperature in and the heat supply to the heating chamber 5. Moreover, the conduit 14 is fitted with a carbon filter 16 to remove stale air, and a sterile filter 17 for the removal of bacteria from the air coming from the heating chamber 5.

In the illustrated embodiment, an expansion chamber disposed after the control valve 15 includes e.g. a lamellar-type machine 18 driven by the gases in said chamber. The machine 18 is designed to deliver power, via the transmission 19, to the shaft of the motor 13 so that the additional power required to drive the motor 13 will be relatively small. The motor 13 could also be used to drive either the vacuum pump 9 or the compressor 10 to the extent that they are separate units.

An insulating material 20 surrounds both the outer jacket 7 of the heating chamber 5 and the compressor 10.

A valve 21 on the lid 3 is arranged to open in conjunction with the raising of the lid 3. The valve 21 could, however, be disposed at any other point in the system, since its task it to cancel the vacuum in the system.

The urine and human body waste is converted into a powder 22.

The container 1 being placed under low pressure by the vacuum pump 9, the urine and the liquid present in the human body waste can be boiled off at temperatures as low as from 20° to 45° C. When the liquid has been boiled off the temperature will increase under low pressure, and should be allowed to rise to between 80° and 135° C. This temperature level is adjusted by means of the control valve 15.

From the foregoing it will be appreciated by the artisan that the invention provides a toilet in which human waste containing naturally occurring liquid components is dessicated under vacuum and with the aid of heat. This toilet generally comprises a hermetically sealable container 1 for receiving human waste, a vacuum pump 9 connected to container 1 so as to reduce the ambient pressure therein, a compressor 10 flow connected to the vacuum pump 9, and a heating chamber 5 having an outlet 14 and disposed in heat transfer relation with the container 1. Heating chamber 5 has an inlet flow connected to the outlet of compressor 10. Vacuum pump 9, compressor 10, and heating chamber 5 work in cooperation with one another, the vacuum pump 9 being operable to effect evaporization of the liquid component in the waste at a temperature established by heat transfer from the heating chamber 5. Vacuum pump 9 passes the evaporation products of the liquid components and air exhausted from container 1 to compressor 10 for compression thereby to a higher temperature pressurized state so as to constitute a heating fluid supplied to heating chamber 5. This heating fluid enters chamber 5 through the inlet thereof and is discharged from the heating chamber through the outlet thereof.

Control valve 15 by controlling the pressure of the heating fluid in chamber 5 likewise controls the temperature of such fluid and the temperature of the waste in the container 1. Because of its pressurization, the heating fluid discharged from chamber 5 still has energy that can be recovered as useful work in an expansion machine 18 before such fluid is ultimately exhausted to the atmosphere, preferably after passage through filters 16 and 17.

What we claim and desire to secure by Letters Patent is:

1. A toilet which comprises a hermetically sealable container for receiving waste containing liquid components, a vacuum pump connected to said container to reduce the ambient pressure therein, a compressor flow connected to said vacuum pump, and a heating chamber having an outlet and disposed in heat transfer relation with said container, said heating chamber having an inlet flow connected to said compressor, said vacuum pump being operable to effect evaporation of said liquid components at a temperature established by heat transfer from said heating chamber, said vacuum pump passing the evaporation products of said liquid components and air exhausted from the container to said compressor for compression thereby to a higher temperature pressurized state to constitute a heating fluid supplied to said heating chamber through the inlet thereof and discharged from the heating chamber through the outlet thereof.

2. A toilet according to claim 1 including pressure control means flow connected with said heating chamber to regulate the pressure of the heating fluid therein and hence the temperature of such heating fluid.

3. A toilet according to claim 1 including means flow connected with said compressor to-intake auxiliary air for compression by said compressor to augment the flow of said heating fluid.

4. A toilet according to claim 1 including a fluid expansion powered machine flow connected to receiving heating fluid discharged from said heating chamber and coupled to at least one of said vacuum pump and compressor to aid in driving ultimate line same by energy recovered from said heating fluid.

5. A toilet according to claim 1 including filter means flow connected with the outlet of said heating chamber and operable to filter the heating fluid discharged therefrom.

6. A toilet according to claim 1 wherein said hermetically sealable container is incorporated in a toilet bowl, said container being hermetically sealed by means of a toilet lid associated with said bowl.

* * * * *